UNITED STATES PATENT OFFICE.

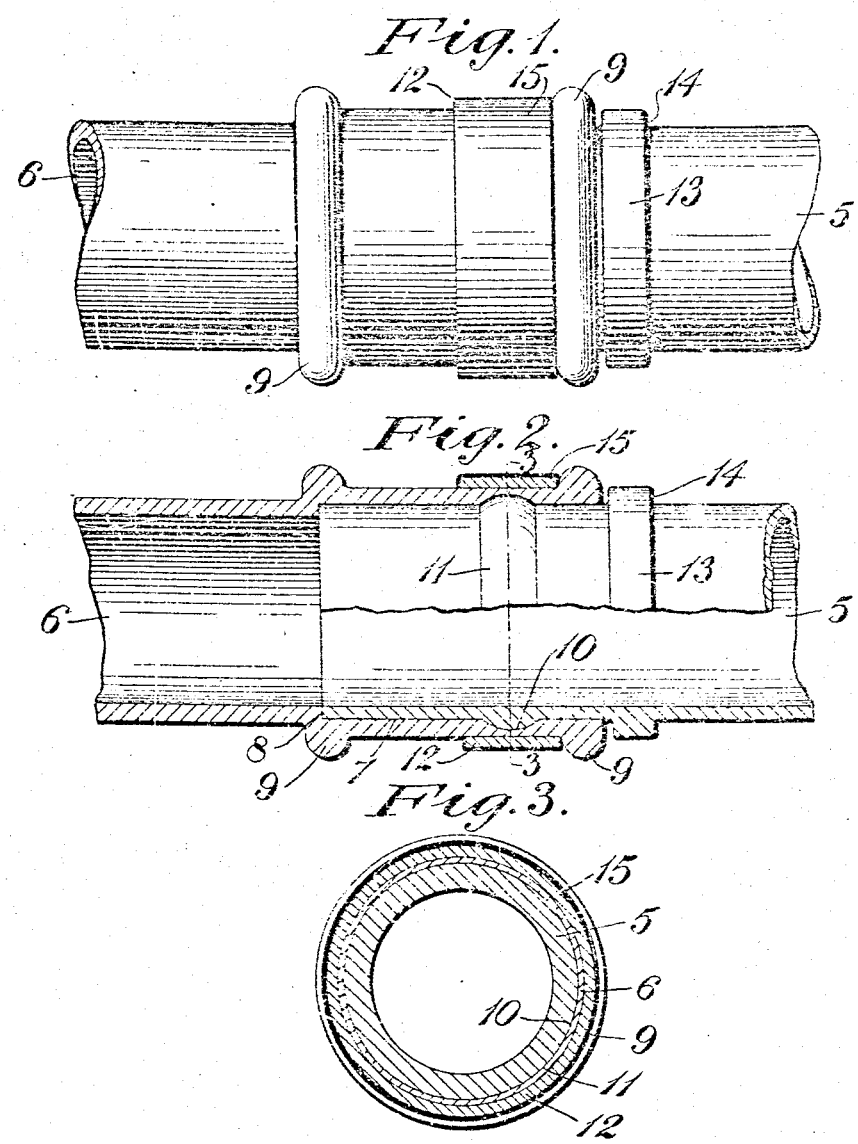

IRA H. SPENCER, OF HARTFORD, CONNECTICUT, ASSIGNOR TO THE SPENCER TURBINE CLEANER COMPANY, OF HARTFORD, CONNECTICUT, A CORPORATION OF CONNECTICUT.

HOSE CONNECTION.

982,355.  Specification of Letters Patent.  Patented Jan. 3, 1911.

Application filed March 19, 1909. Serial No. 484,525.

*To all whom it may concern:*

Be it known that I, IRA H. SPENCER, a citizen of the United States, and a resident of Hartford, in the county of Hartford and State of Connecticut, have invented a new and Improved Hose Connection, of which the following is a specification.

My invention relates more especially to the class of devices employed for the temporary connection of flexible tubing, as hose and the like, and the object of the invention is to provide a device of this class having novel features of advantage and utility.

One form of device in the use of which the object sought may be attained, is illustrated in the accompanying drawings, in which—

Figure 1. is a side view of the ends of two pieces of hose united with my improved connection. Fig. 2. is a view partly in central longitudinal section through the same. Fig. 3. is a view in cross-section on plane denoted by dotted line 3—3 of Fig. 2.

The device herein illustrated and described embodies means whereby two sections of flexible tubing, as hose or the like, may be securely united to effectually prevent leakage at the joint. The device is especially applicable for use in the temporary connection of sections of hose, more especially those employed in the operation of cleaning apparatus in which it is desirable that the connection may be made or severed with as little effort as possible, and also one in which lightness is an essential feature; and also one having little liability to mar the surface of floors, furniture and the like. A device embodying these desirable features is illustrated in the accompanying drawings, in which the numeral 5 illustrates the end of one section of a piece of hose, and the numeral 6 the end of another section. Both of these ends are preferably formed of elastic material, as rubber. One of the sections as the end 5 is made of a size to quite snugly fit within the end of the other section. This fit, however, is such that the end 5 may be introduced into the end 6 and forced in to the required extent without undue effort. In the preferred form of construction the end 6 is provided with a recess 7 terminating at its inner end at shoulder 8, against which the end of the section 5 abuts. Retainers for a clamping band are located on the end 6, in the preferred form of construction as herein shown, these retainers consisting of ribs 9, extending about the end 6 and at some distance apart. The inner surface of the end 6 is formed for engagement with the end 5, in the preferred form of construction and as shown herein, an annular groove 10 extending about the inner surface of the end 6. A rib 11 is formed upon the outer surface of the end 5 to engage within the groove 10.

As hereinbefore stated, the recesses in the end 6 and the end 5 are of such relative size that the one while snugly fitting within the other does not fit so closely but that it may be inserted without the application of undue force; that is, the fit should be such that the parts may be engaged with the exertion of but comparatively little human strength. By constructing the two ends of elastic material and to fit as above described, a very close union is obtained between the outer surface of the inner member, and the inner surface of the outer member. As the parts are inserted one within the other, both may give to a slight extent to enable this insertion, and when the engaging means are in proper position the parts will assume their normal shape without any appreciable distortion.

In the use of the connection with pneumatic apparatus in which a suction is employed, the effect of this suction will serve to close the joint and increase its effectiveness as to tightness. In order to further render the joint free from liability to leakage, a clamping band 12 is employed. This may be of any desired material, preferably metal, fitted to the outer surface of the end 6 and resting between the ribs 9. It is of such size that while it may be quite readily moved along the surface of the end 6 between these ribs, yet will fit so closely as to hold the rib 11 and wall of the recess 10, or other interengaging means when employed, securely together. The end 5 is provided with a rib 13, forming a shoulder 14 to engage a lip or like part upon a valve and thus prevent accidental removal of the end 5 when it is inserted directly in a valve coupling.

While I have shown and described herein the inner member as formed integral with the section of hose of which it forms the end, the invention is not limited to such, as this end need not necessarily form an integral part of such section or be formed of the same material, and the details of construction may be otherwise departed from to a greater or lesser extent without avoiding the invention.

I am aware that it is old to stretch an elastic tube over the end of a rigid connection, the latter of which may be provided with grooves into which the elastic material is forced by compression in the effort of such material to resume its normal position, and that clamping bands, wire, etc., have been employed to hold the parts, but whether such bands are or not employed the structure is one in which the tube is permanently or at least semi-permanently held in place and would not answer the requirements of a device in which it is essential that the parts may be readily engaged and disengaged as in the structure shown herein. My device differs from such prior structures in that the surface of one of the meeting ends at least which rests against the other surface being of flexible material embodies qualities that cause the surfaces to closely adhere. The parts are so formed that while the contact surfaces lie closely against each other, they do so without undue distortion, a condition favorable to extended usefulness of the structure, and this close contact is aided by the suction produced in the hose, so that while an extremely tight joint is obtained the structure is extremely light and sightly without undue projections at the joint, and the two sections may be readily engaged and disengaged as is frequently required in operations of this kind to provide longer or shorter lengths of hose.

The socket 7 in the end of one of the sections enables a smooth joint to be obtained and a practically smooth wall throughout the inner surface of the hose is thus provided, which is of particular advantage in pneumatic cleaning, as there are no projections or corners upon which the debris taken up by the machine may catch. The ring 12 is preferably provided with a covering 15 of rubber or other comparatively soft material, as shown by heavy black lines in Figs. 2 and 3, thus rendering the entire device free from any liability to mar floors or furniture.

I claim:

1. A connection for flexible tubing, including two ends, each formed of flexible material, one removably fitting securely within the other, inter-engaging means upon the meeting faces of the two ends, and a sliding band movably positioned to prevent disengagement of said engaging means.

2. A connection for flexible tubing, including an end composed of flexible material having annular ribs providing a space between them, a clamping member slidingly located between said ribs, an end composed of flexible material constructed to removably fit securely within the end of the other member, and inter-engaging means in the meeting faces of said ends arranged to be held by said clamping member.

3. A connection for flexible tubing, including the end of a section formed of flexible material having a recess, and the end of another section formed of flexible material and constructed to removably fit securely within said recess, annular ribs formed upon one end and located to provide a space between the ribs, a clamping member movably mounted between said ribs, and inter-engaging means between the two ends arranged to be held in engagement by said clamping member.

IRA H. SPENCER.

Witnesses:
JOSEPH M. MENOW,
ALONZO M. LUTHER.